US011093645B2

(12) United States Patent
 Gkoulalas-Divanis

(10) Patent No.: US 11,093,645 B2
(45) Date of Patent: *Aug. 17, 2021

(54) COORDINATED DE-IDENTIFICATION OF A DATASET ACROSS A NETWORK

(71) Applicant: International Business Machines Corporation, Armonk, NY (US)

(72) Inventor: Aris Gkoulalas-Divanis, Waltham, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,061

(22) Filed: Jun. 20, 2019

(65) Prior Publication Data
US 2019/0303617 A1    Oct. 3, 2019

Related U.S. Application Data

(63) Continuation of application No. 15/903,673, filed on Feb. 23, 2018.

(51) Int. Cl.
*G06F 21/62* (2013.01)
*G06F 21/60* (2013.01)

(52) U.S. Cl.
CPC ........ *G06F 21/6254* (2013.01); *G06F 21/602* (2013.01); *G06F 21/604* (2013.01)

(58) Field of Classification Search
CPC ... G06F 21/6254; G06F 21/602; G06F 21/604
See application file for complete search history.

(56) References Cited

U.S. PATENT DOCUMENTS

| 7,493,344 | B2 * | 2/2009 | Wald | G06F 16/2379 |
| 8,024,339 | B2 * | 9/2011 | Barker | G06F 21/6245 |
| | | | | 707/736 |

(Continued)

FOREIGN PATENT DOCUMENTS

WO    WO-2014075836 A1 *    5/2014    ......... G06F 21/6254

OTHER PUBLICATIONS

Rabotka et al., "An Evaluation of Recent Secure Deduplication Proposals", Elsevier Journal of Information Security and Applications, 2016, 38 pages.

(Continued)

*Primary Examiner* — Kevin Bechtel
*Assistant Examiner* — Thanh H Le
(74) *Attorney, Agent, or Firm* — Will Stock; Edell, Shapiro & Finan, LLC

(57) ABSTRACT

Methods, systems, and computer program products are provided. A network device receives, from a client device, a description of a dataset to be de-identified, and a list of one or more data de-identification techniques selected from groups consisting of a group of data masking techniques and a group of data pseudonymization techniques, and their configuration options supported by the client device. A first technique, from the at least one group of techniques and its configuration options supported by the client device and the network device are determined. The network device receives a dataset produced at the client device by applying the first technique and selected configuration options to corresponding attributes from the client device. The network device applies a de-identification technique to the dataset to produce a resulting set of de-identified data, wherein the de-identification technique is coordinated with the first technique and its configuration options to de-identify the dataset.

6 Claims, 9 Drawing Sheets

(56) References Cited

U.S. PATENT DOCUMENTS

| | | | |
|---|---|---|---|
| 8,626,749 B1 | 1/2014 | Trepetin et al. | |
| 9,031,895 B2* | 5/2015 | Schon | G06F 16/24564 |
| | | | 706/48 |
| 9,646,166 B2* | 5/2017 | Cash | G06F 21/602 |
| 9,720,750 B1 | 8/2017 | Abrams et al. | |
| 2002/0169793 A1* | 11/2002 | Sweeney | G06F 21/6245 |
| 2010/0198730 A1 | 8/2010 | Ahmed et al. | |
| 2014/0019516 A1 | 1/2014 | Banerjee et al. | |
| 2015/0149208 A1* | 5/2015 | Lynch | G16H 10/60 |
| | | | 705/3 |
| 2015/0163206 A1 | 6/2015 | McCarthy et al. | |
| 2016/0323140 A1 | 11/2016 | Ponnuswamy | |
| 2019/0266352 A1 | 8/2019 | Gkoulalas-Divanis | |

OTHER PUBLICATIONS

Khakpour et al., "First Step Toward Cloud-Based Firewalling", Reliable Distributed Systems (SRDS), IEEE, 2012, 10 pages.
Shi et al., "Privacy-preserving Network Functionality Outsourcing", arXiv preprint: 1502.00389, Feb. 2015, 9 pages.
List of IBM Patents or Patent Applications Treated as Related, filed Jun. 20, 2019.

\* cited by examiner

COORDINATED DE-IDENTIFICATION OF A DATASET ACROSS A NETWORK

BACKGROUND

1. Technical Field

Present invention embodiments relate to methods, systems and computer program products for receiving at a network device a dataset with masked direct identifiers from a client's site and performing further data de-identification of the dataset to protect indirect (or quasi) identifiers and sensitive attributes. In particular, a server receives from a customer site a person-specific dataset with masked direct identifiers, discovers indirect/quasi identifiers and sensitive attributes within the dataset, and performs further compatible data de-identification techniques to protect the indirect identifiers and the sensitive attributes of the dataset.

2. Discussion of the Related Art

Data anonymization is a data sanitization process for protecting personally identifiable information in datasets, including both direct identifiers that can directly identify individuals such as, for example, full names of individuals, social security numbers, customer numbers, patient identifiers, phone numbers, credit card numbers, etc., as well as indirect identifiers, which are non-direct identifier attribute values in a dataset, a combination of which may be unique for some individuals and could be used to re-identify these individuals. For example, a five-digit zip code of a home address, a gender, and a date of birth of individuals are well-known quasi-identifiers because a combination of their values has been shown to be unique for a large number of United States residents.

A third type of identifier in a dataset is sensitive attributes, which are non-direct, non-quasi-identifier attributes having values that are sensitive and should therefore not be linked to specific individuals. As an example, individuals may not want to be linked with disease, salary, or sensitive location information in a dataset (e.g., church, hospital, etc.). Preventing linkage of individuals to their sensitive attribute values blocks sensitive information disclosure attacks and goes beyond protection against subject re-identification. However, preventing sensitive information disclosure is usually part of data de-identification efforts.

Personal data that have been "sufficiently anonymized" such as, for example, anonymized data that satisfies the Health Insurance Portability and Accountability Act (HIPAA) requirements in the United States or the General Data Protection Regulation (GDPR) in Europe, can be used for secondary purposes, such as for supporting various types of data analyses.

Data owners are hesitant to allow highly sensitive personal data such as, for example, customers' transactions, purchase records, healthcare information, etc., to leave their premises (even in encrypted form using state-of-the-art encryption algorithms) for uploading to a cloud platform for de-identification and additional processing to support business use cases, analytics and other uses. Before allowing highly sensitive personal data to leave their premises, data owners are increasingly using existing in-house solutions for performing data de-identification, which are limited to the support of data masking algorithms and in most cases are unable to adequately protect data to meet legal requirements.

SUMMARY

According to a first aspect of embodiments of the invention, a method of de-identifying a dataset is provided. A network device receives information from a client device, wherein the information includes a list of at least one group of techniques selected from groups consisting of a group of data masking techniques and a group of pseudonymization techniques, associated configuration options that are supported by the client device and a description of a dataset to be de-identified. The network device determines a first technique from the at least one group of techniques and associated configuration options supported by the client device and the network device. The network device receives a dataset from the client device, wherein the dataset is produced at the client device by applying the determined first technique and the associated configuration options to corresponding attributes. A de-identification technique is applied to the dataset at the network device to produce a resulting set of de-identified data, wherein the data de-identification technique is coordinated with the first technique and configuration options to further de-identify the dataset.

According to a second aspect of embodiments of the invention, a system for de-identifying data of a dataset is provided. The system includes at least one processor and at least one memory having instructions embodied therein such that the at least one processor is configured to perform: receiving information from a client device, wherein the information includes a list of at least one group of techniques selected from groups consisting of a group of data masking techniques and a group of data pseudonymization techniques, and associated configuration options that are supported by the client device and a description of a dataset to be de-identified; determining a first technique from the at least one group of techniques and configuration options that are supported by the client device and the system; receiving a dataset from the client device, wherein the dataset is produced at the client device by applying the determined first technique and the associated configuration options to corresponding data attributes; and applying a de-identification technique to the dataset to produce a resulting set of de-identified data, wherein the de-identification technique is coordinated with the first technique and the associated configuration options to de-identify the masked dataset.

According to a third aspect of embodiments of the invention, a computer program product including at least one computer readable storage medium having computer readable program code embodied therewith for execution on at least one processor is provided. The computer readable program code is configured to be executed by the at least one processor to perform: receiving information from a client device, wherein the information includes a list of at least one group of techniques selected from groups consisting of a group of data masking techniques and a group of data pseudonymization techniques, and associated configuration options that are supported by the client device and a description of a dataset to be de-identified; determining a first technique from the at least one group of techniques, associated configuration options supported by the client device and a system including the at least one processor; receiving a dataset from the client device, wherein the dataset is produced at the client device by applying the determined first technique and the associated configuration options to corresponding data attributes; and applying a de-identification technique to the dataset to produce a resulting set of de-identified data, wherein the de-identification technique is coordinated with the first technique and the configuration options to de-identify the dataset.

BRIEF DESCRIPTION OF THE DRAWINGS

Generally, like reference numerals in the various figures are utilized to designate like components.

DETAILED DESCRIPTION

Indirect identifiers are non-direct identifiers and non-sensitive attributes having a combination of values in a dataset that may be unique for some individuals. Thus, combinations of indirect identifier attribute values can be used to re-identify vulnerable individuals. Discovery of indirect identifiers in a dataset makes data anonymization a highly computationally demanding process. Highly scalable methods and a significant amount of processing and memory resources are required for discovering and protecting indirect identifiers, especially when using large datasets, containing millions of records and hundreds of attributes. Such processing and memory resources may only be available in cloud platforms.

Direct identifiers are individual attributes having values that can be used to identify an individual. Data masking and data pseudonymization technology protects direct identifiers in a dataset such as, for example, full names of individuals, social security numbers, medical IDs, phone numbers, credit card numbers, email addresses, etc., which are personal information that is most vulnerable in a person-specific dataset with respect to re-identification of individuals via triangulation attacks with external, publicly available datasets, such as voter registration lists, yellow pages, etc. Protection of direct identifiers in a dataset significantly reduces an overall privacy risk, thereby making the dataset less vulnerable during data transfer.

In comparison to data anonymization, data masking or pseudonymization of direct identifiers is a relatively inexpensive operation that can be supported with a low-cost infrastructure that can be found in many small businesses. Most data masking operations are scalable to extremely large datasets and involve a transformation of data elements that are independent from each other or have minor dependencies that are easily evaluated and accommodated.

According to various embodiments, a computing system at a customer site may perform data de-identification of direct identifiers of a dataset via data masking or data pseudonymization techniques. Data masking products such as, for example, InfoSphere Optim, which is available from International Business Machines Corporation of Armonk, N.Y., can be used to perform data masking to protect direct identifiers in a dataset. Information about the dataset to be de-identified may be exchanged between a second computing system and the computing system at the customer's site such that the computing system at the customer's site can perform masking or data pseudonymization of direct identifiers in the dataset using a data de-identification technique and a configuration option that is dictated by the second computing system and is compatible with data anonymization techniques used by the second computing system. The second computing system may be included in a cloud computing platform having, for example, a server or a server farm.

Figure 1:
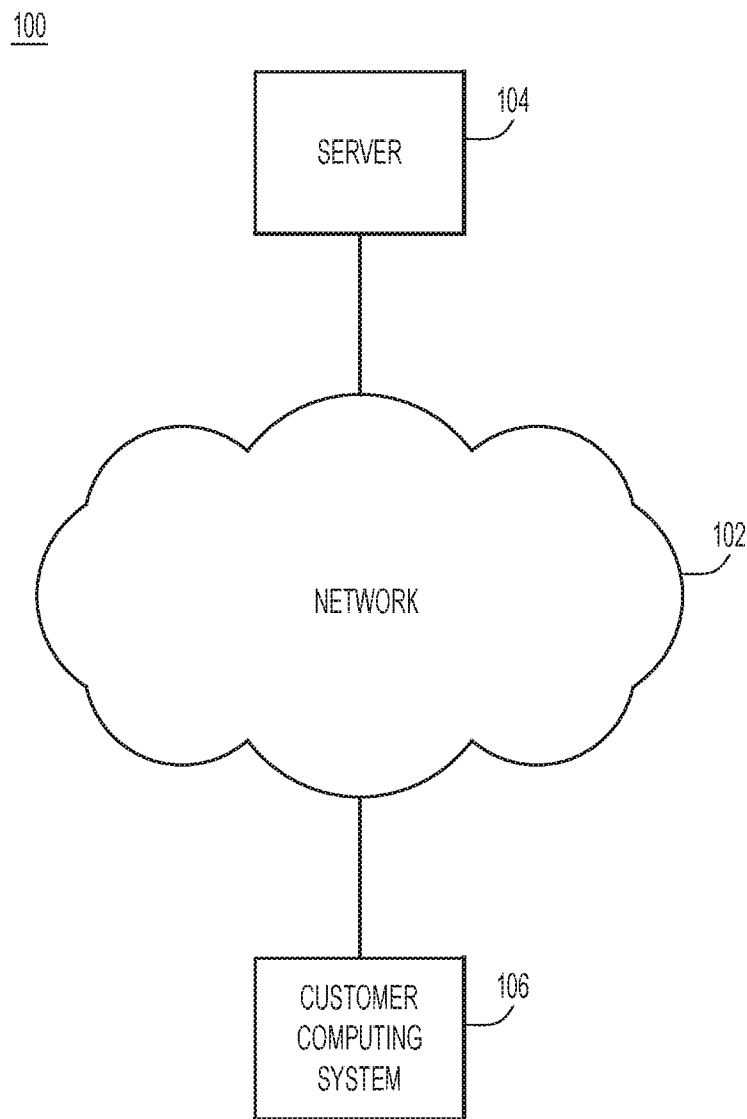
FIG. 1 illustrates an example environment in which embodiments of the invention may operate.

FIG. 1 illustrates an example environment 100 in which various embodiments may operate. Example environment 100 includes a network 102 to which are connected, via a wired or wireless connection, a server 104 and a customer computing system 106. In some embodiments server 104 may include a server farm in a cloud computing platform as described below.

Network 102 may be implemented by any number of any suitable communications media (e.g., wide area network (WAN), local area network (LAN), Internet, Intranet, etc.) or a combination of any of the suitable communications media. Network 102 may include wired and/or wireless networks.

Customer computing system 106 may include a desktop computer, a laptop computer, or other type of computer. Server 104 may include a single computer or may include multiple computers configured as a server farm. The one or more computers of server 104 may include a mainframe computer, a desktop computer, or other types of computers.

Various applications of server 104 may be provided in a cloud environment. It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 2:
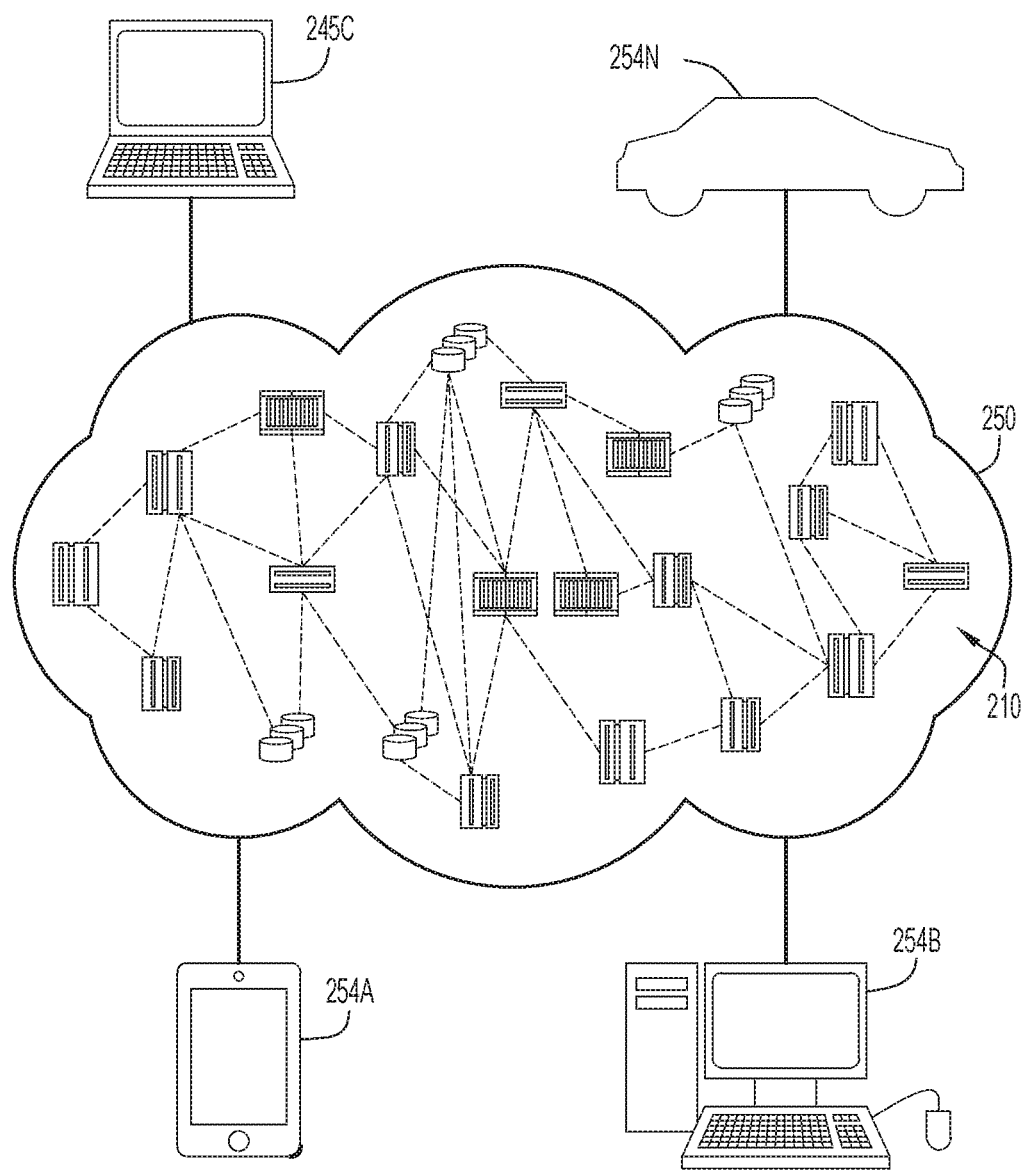
FIG. 2 illustrates an example cloud computing environment in which a server according to embodiments of the invention may operate.

A cloud computing environment is service oriented with a focus on statelessness, low coupling, modularity, and semantic interoperability. At the heart of cloud computing is an infrastructure comprising a network of interconnected nodes. Referring now to FIG. 2, an illustrative cloud computing environment 250 is depicted. As shown, cloud computing environment 250 comprises one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
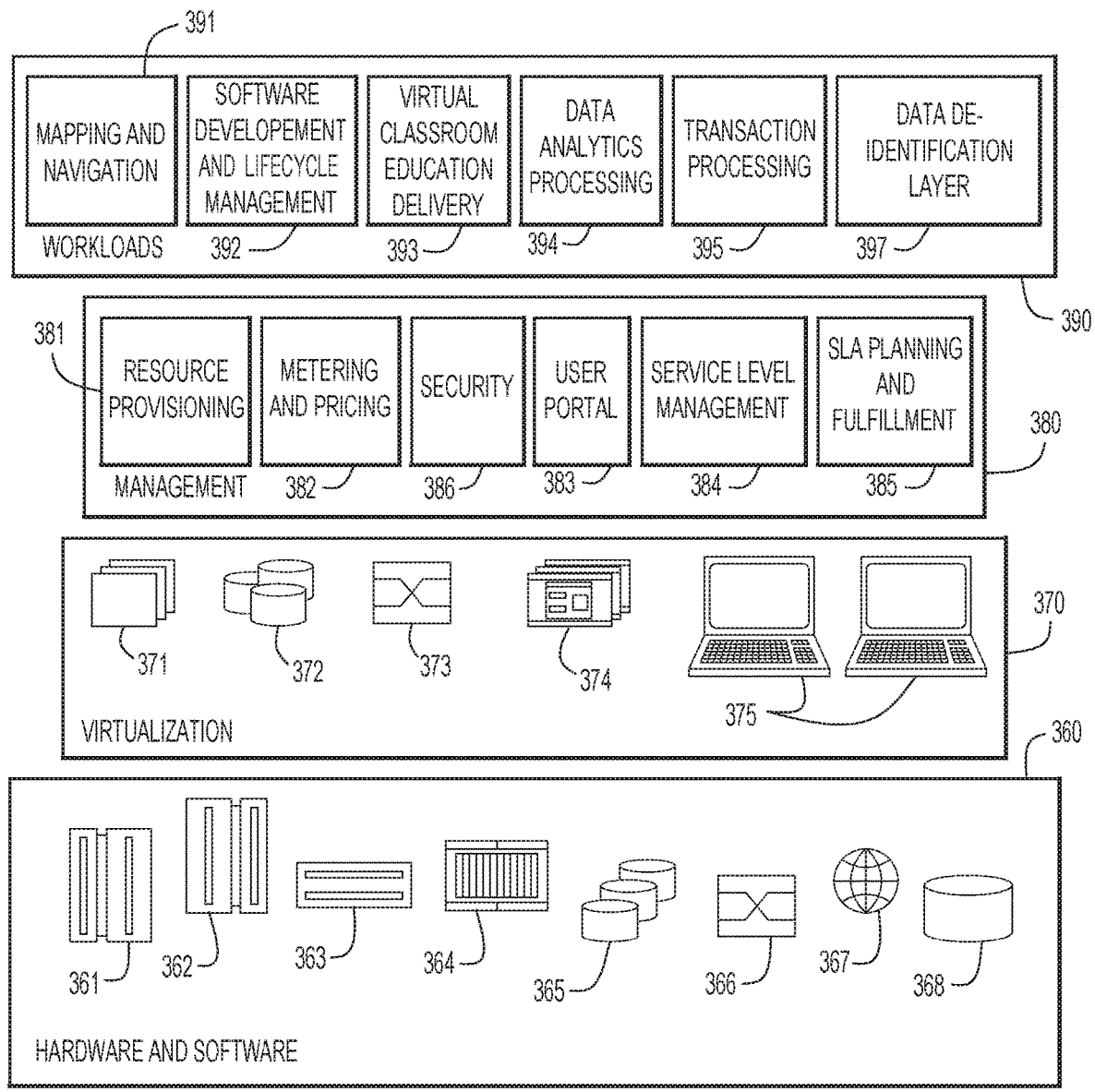
FIG. 3 shows a set of functional abstraction layers provided by a cloud computing environment according to embodiments of the invention

Referring now to FIG. 3, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture-based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example embodiment, management layer 380 may provide some or all of the functions for a data center. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may comprise application software licenses. Security 386 provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide prearrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and data de-identification layer 397.

Figure 4:
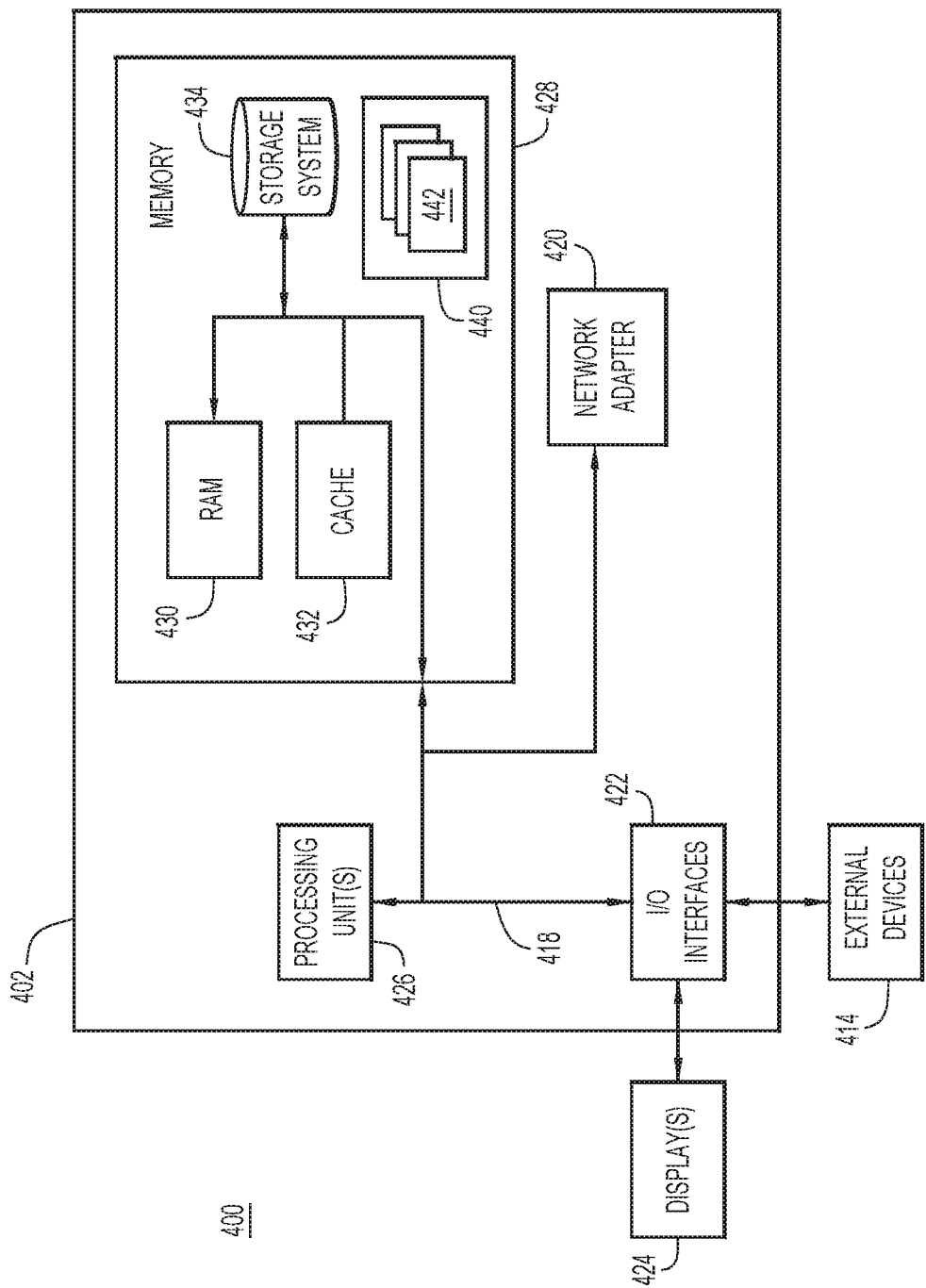
FIG. 4 illustrates a computing system that may implement a server or a customer's computing system according to embodiments of the invention.

Referring now to FIG. 4, a schematic of an example of a computing node or device 400 is shown. The computing node or device may implement customer computing system 106 outside of a cloud computing environment or server 104 in a cloud computing environment and is not intended to suggest any limitation as to the scope of use or functionality of embodiments of the invention described herein. Regardless, computing node 400 is capable of being implemented and/or performing any of the functionality set forth herein.

In computing node 400, there is a computing system 402 which is operational with numerous other general purpose or special purpose computing system environments or configurations. Examples of well-known computing systems, environments, and/or configurations that may be suitable for use with computing system 402 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computing system 402 is shown in a form of a general-purpose computing device. Components of computing system 402 may include, but are not limited to, one or more processors or processing units 426, a system memory 428, and a bus 418 that couples various system components including system memory 428 to one or more processing units 426.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system 402 typically includes a variety of computer system readable media. Such media may be any available media that is accessible by computing system 402, and may include both volatile and non-volatile media, removable and non-removable media.

System memory 428 can include computer system readable media in the form of volatile memory, such as random access memory (RAM) 430 and/or cache memory 432. Computing system 402 may further include other removable/non-removable, volatile/non-volatile computer system storage media. By way of example only, storage system 434 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, the one or more application programs, the other program modules, and the program data or some combination thereof, may include an implementation of a networking environment. Program modules 442 generally carry out the functions and/or methodologies of embodiments of the invention as described herein.

Computing system 402 may also communicate with one or more external devices 414 such as a keyboard, a pointing device, one or more displays 424, one or more devices that enable a user to interact with computing system 402, and/or any devices (e.g., network card, modem, etc.) that enable computing system 402 to communicate with one or more other computing devices. Such communication can occur via Input/Output (I/O) interfaces 422. Still yet, computing system 402 can communicate with one or more networks such as a local area network (LAN), a general wide area network (WAN), and/or a public network (e.g., the Internet) via network adapter 420. As depicted, network adapter 420 communicates with the other components of computing system 402 via bus 418. It should be understood that, although not shown, other hardware and/or software components could be used in conjunction with computing system 402. Examples, include, but are not limited to: microcode, device drivers, redundant processing units, external disk drive arrays, RAID systems, tape drives, and data archival storage systems, etc.

Figure 5:
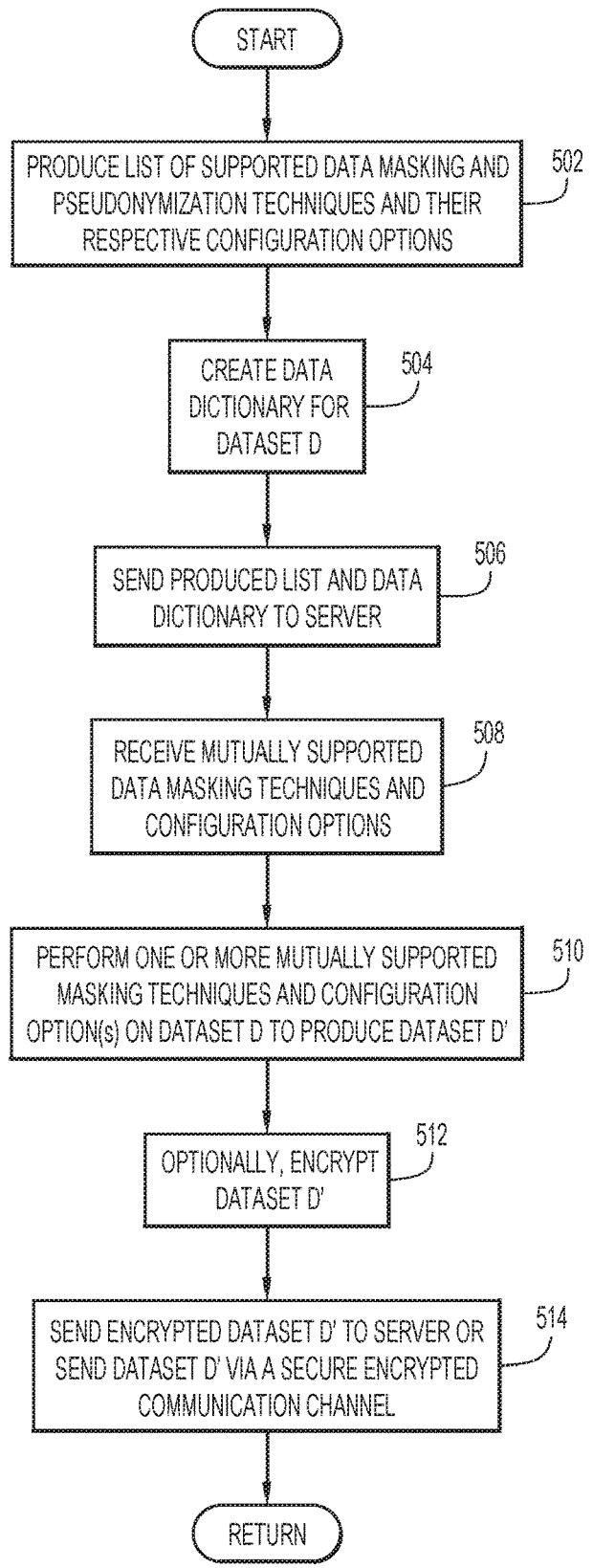
FIG. 5 is a flowchart of an example process that may be performed in a customer's computing system according to embodiments of the invention.

FIG. 5 is a flowchart that illustrates an example process that may be performed in customer computing system 106 according to various embodiments. The process of FIG. 5 may begin with customer computing system 106 producing a list of supported data masking and data pseudonymization techniques and their respective configuration options (act 502). The data masking techniques may include, but not be limited to, substitution, data suppression and masking out as well as other data masking techniques.

Next, customer computing system 106 may create a data dictionary for a dataset D, which may be co-located with customer computing system 106 (act 504). The data dictionary may include information regarding attributes of the dataset D including, but not limited to: attribute names; attribute types (e.g., integer, string, floating point, etc.); and associated metadata including, but not limited to, a description of what is stored in an attribute, information regarding whether an attribute is allowed to contain NULL (empty) values, whether an attribute is a primary or secondary key (hence, it contains a unique non-empty value per data record), etc. The created data dictionary may then be sent to server 104 via network 102 (act 506).

Customer computing system 106 may receive a list of mutually supported data masking and pseudonymization techniques along with their supported configuration options from server 104 (act 508; FIG. 5) and may perform one or more of the mutually supported data masking and pseudonymization techniques and their associated configuration options on the dataset D to produce masked dataset D' (act 510). Customer's computing system 106 may then encrypt the masked dataset D' (act 512) and may send the encrypted masked dataset D' to server 104 (act 514). Alternatively, in some embodiments, customer computing system 106 may send the masked dataset D' over a secure, encrypted communication channel to server 104.

Figure 6:
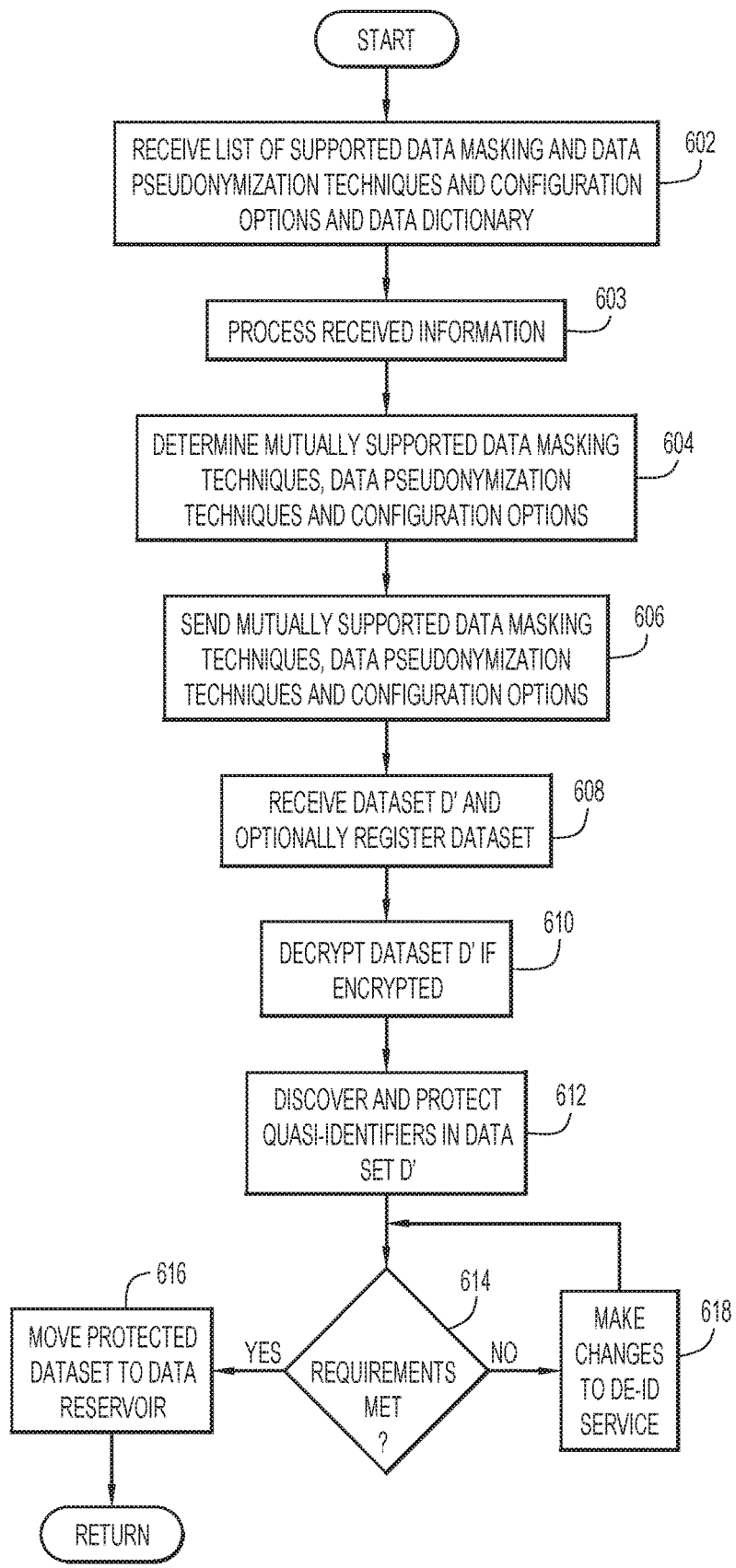
FIG. 6 is a flowchart of an example process that may be performed by a server in a cloud computing platform according to embodiments of the invention.

FIG. 6 is a flowchart of an example process that may be performed in server 104 according to various embodiments.

Server 104 may include an asset inventory database, which may include information about all sources of data and their associated metadata that are stored in a corresponding server (or cloud infrastructure). Server 104 may also include a data dictionary having stored therein information about attributes that appear in each of the sources of data that are ingested to the corresponding server (or cloud infrastructure). As an example, the information may include, but not be limited to: attribute names; attribute types; attribute definitions; and associated metadata. The data dictionary in server 104 additionally may include at least a characterization of all direct identifiers from each ingested data source and may additionally include a characterization of other attributes of each ingested data source, as an indirect/quasi identifier, a sensitive attribute, or a non-identifier. Knowledge of at least the direct identifiers in the ingested data sources that is provided to the corresponding server (or cloud infrastructure), allows machine learning and record linkage approaches to be used in order to enable mapping of attributes from the dictionary of dataset D (act 504) to attributes of the data dictionary in server 104, leading to recognition of the direct identifiers of the dataset D. As an example, the information in the data dictionary may be used by server 104 to map attribute NAME of a dataset to a direct identifier NAME, attribute SSN of the dataset to a direct identifier Social Security Number, etc., and to learn that these attributes are direct identifiers of dataset D, as well as to discover the data masking and pseudonymization algorithms that should be used for processing these attributes.

Server 104 may further include a data catalog service that makes querying of data included in the data dictionary and the asset inventory database possible.

In the example process of FIG. 6, server 104 may receive (act 602) the list of supported data masking and data pseudonymization techniques from customer computing system 106 (see FIG. 5, act 506) and may process this received information (act 603) to map attributes of the data dictionary from customer computing system 106 to attributes in the data dictionary at server 104. Details of act 603 are further explained below with reference to FIG. 7.

Server 104 may then determine data masking techniques, data pseudonymization techniques and configuration options that are mutually supported by customer computing system 106 and server 104 based on results of act 603 (act 604) and may send a list of the mutually supported data masking techniques, data pseudonymization techniques and their configuration options to customer computing system 106 (act 606) for processing (see FIG. 5, act 508).

For example, suppose the dataset at customer computing system 106 does not include a gender attribute, but has attribute values for attribute NAME, which is a name of an individual. NAME may be mapped during act 603 to a direct identifier. Also, suppose that gender utility should be preserved for one or more analytics to be performed on the de-identified dataset. Server 104 may send information to customer computing system 106 indicating that customer computing system 104 may de-identify attribute values for NAME such that a male name may be mapped to a different male name and a female name may be mapped to a different female name. Gender-neutral names could be mapped to other gender-neutral names. This utility-preserving masking of attribute NAME, allows the attribute to retain gender information, useful for subsequent data analysis, while protecting the individuals from re-identification attacks.

In general, server 104 may determine how each of direct identifier should be processed by customer computing system 106 by selecting: a NAME masking provider of client software of the customer computing system 106 such as, for example, Optim; a credit card masking provider for processing a direct identifier, CREDIT CARD; a hash masking provider for processing a direct identifier, SOCIAL SECURITY NUMBER, and so on.

According to some embodiments, server 104 may use machine learning techniques to determine data masking techniques, data pseudonymization techniques and their configuration options during act 604. For example, server 104 may record information regarding determinations of mutually supported data masking techniques and their configuration options including, but not limited to, attribute name, attribute type, detailed attribute description, attribute characterization (as a direct identifier, an indirect/quasi identifier, a sensitive attribute, or a non-identifier), appropriate data masking techniques and/or data pseudonymization techniques for processing a corresponding attribute, configuration options available on customer computing system 106, types of analytics to be performed, and mutually supported data masking techniques, data pseudonymization techniques and configuration options. When server 104 determines the mutually supported data masking techniques, the data pseudonymization techniques and associated configuration options, for each attribute that is determined to be a direct identifier, server 104 may examine the recorded information to find direct identifier attributes having similar names, data types and descriptions with a same type of analytics to be performed with respect to the attribute and having similar data masking techniques and/or data pseudonymization techniques and configuration options available on a respective customer computing system 106. Server 104 may then determine mutually supported data masking techniques and/or data pseudonymization techniques and their configuration options based on the recorded historical data regarding previously determined mutually supported data masking techniques, data pseudonymization techniques and their configuration options.

Server 104 may receive dataset D' from customer computing system 106 (see FIG. 5, act 514), either in an encrypted form, or via a secure, encrypted communication channel, and may optionally register the dataset D' with the asset inventory database (act 608). Server 104 may decrypt the dataset D' (act 610), if it was encrypted, and may discover and protect new quasi-identifiers (or indirect identifiers) and sensitive attributes in the dataset D' that are not already identified as direct or indirect identifiers, by mapping attributes of the received data dictionary to attributes of the data dictionary of server 104 (act 612). For example, if a unique combination of attribute values is discovered for a record of the dataset D', then at least one of the attribute values of the unique combination may be transformed (usually via data generalization or suppression) such that the unique combination of attribute values no longer appears in the dataset D'.

Server 104 may then determine whether the privacy protection requirements have been met as required (act 614).

If so, then the protected dataset D' may be moved to a data reservoir to be made available for various analytic processes (act 616).

If, during act 614, server 104 determines that the privacy protection requirements have not been met, then server 104 may make changes to its de-identification service (act 618) including, but not limited to, expanding upon de-identification of direct identifiers, changing a data masking technique or a data pseudonymization technique, protecting sensitive attributes in the data, and increasing the protection of indirect/quasi identifying attributes. Server 104 may then determine whether the privacy protection requirements have or have not been met (act 614).

If, during act 614, server 104 determines that the privacy protection requirements have been met, then the protected dataset may be moved to a data reservoir where it becomes available for various analytic applications (act 616).

Figure 7:
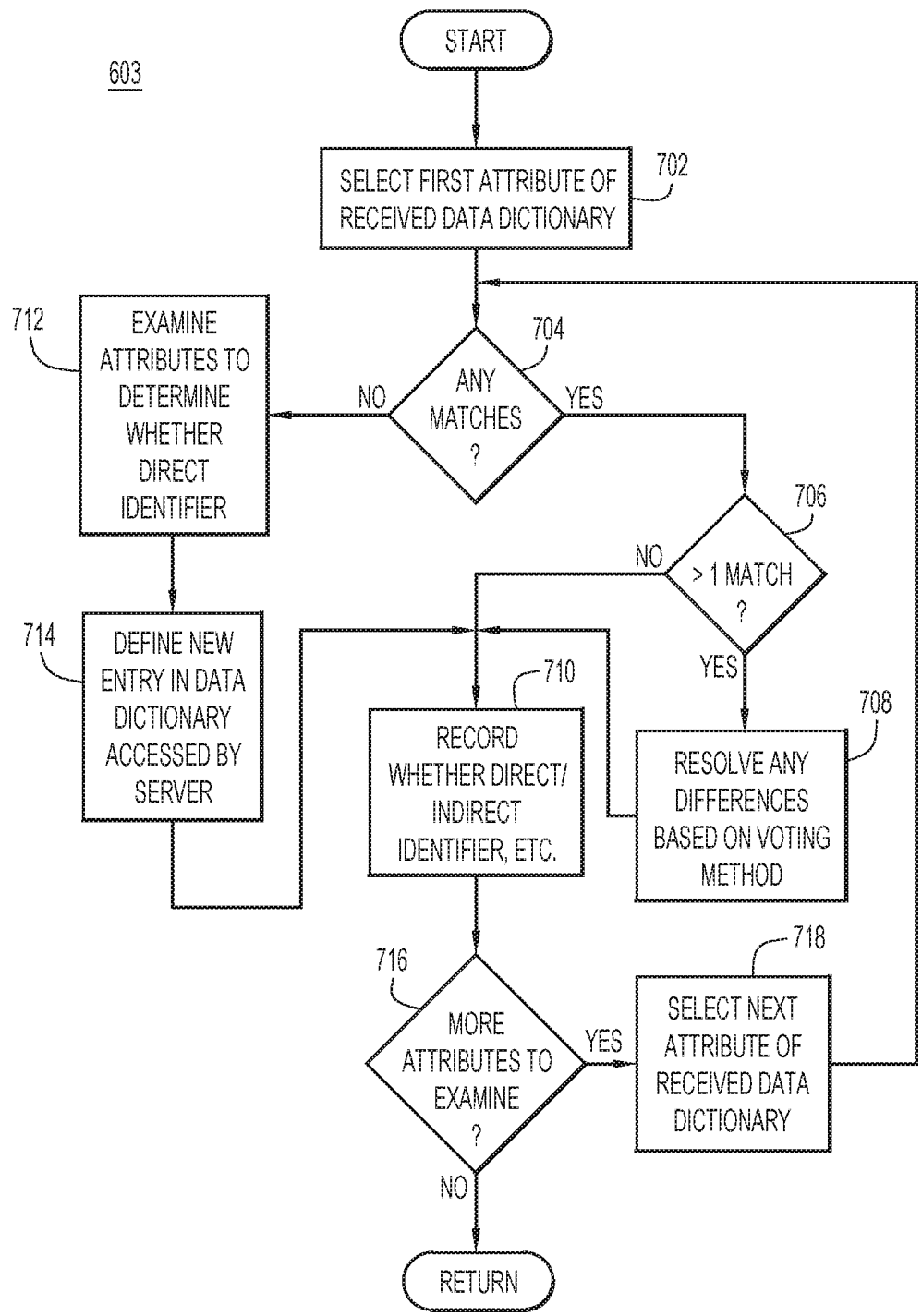
FIG. 7 is a flowchart of an example process that a server may perform to map attributes of a data dictionary, received from a customer's computing system, to attributes of a data dictionary of the server according to embodiments of the invention.

FIG. 7 is a flowchart of an example process for processing the list of data masking techniques and data pseudonymization techniques (act 603 of FIG. 6) according to some embodiments. The process may begin by server 104 selecting a first attribute of the received data dictionary (act 702) and determining whether the attribute matches at least one attribute in the data dictionary of server 104 (act 704). Matching may not be done only based on the attribute name, but also based on the description and associated metadata. For example, according to some embodiments, when server 104 receives the data dictionary from customer computing system 106, server 104 may try to perform record linkage of each record in the received data dictionary with one or more records from the data dictionary of server 104. This record linkage, or machine learning task, may be performed based on all information/fields that are available in both the received data dictionary and the data dictionary of server 104. For example, if a description of an attribute is provided in both dictionaries, then these attributes may be checked for matching; attribute names may be checked for matching; type of attributes (integer, float, string) may be checked for matching; information on whether or not the attributes may contain NULL/empty values may be checked; etc. If the attribute has a match, then server 104 may determine whether the attribute matches multiple attributes in the data dictionary of server 104 (act 706). If the attribute has multiple matches, then server 104 may resolve any differences, or conflicts, among the matches (act 708). One technique that may be used to resolve differences includes a voting method (act 708).

According to the voting method, each of the multiple matching attributes has a vote. The attribute of the received data dictionary may be determined to be a direct identifier or part of an indirect identifier based on whether a highest number of matching attributes in the data dictionary of server 104 are indicated as being a direct identifier or part of an indirect identifier. In other embodiments, other methods may be used to resolve any differences among multiple matching attributes of the data dictionary of server 104.

Server 104 may then record whether the attribute of the received data dictionary is a direct identifier, part of an indirect identifier, a sensitive attribute, or a non-identifier (act 710). A determination may then be made regarding whether there are any additional attributes in the received data dictionary to examine (act 716). If there are no additional attributes to examine, then the process is completed. Otherwise, server 104 may select a next attribute of the received data dictionary to examine (act 718). Act 704 may then be performed again to determine whether the next attribute matches any attributes of the data dictionary of server 104.

If, at act 706, a determination is made that the selected attribute matches only one attribute of the data dictionary of server 104, then acts 710, 716 and 718 may again be performed as previously described.

If, at act 704, a determination is made that the selected attribute does not match any attributes of the data dictionary of server 104, then server 104 may examine the attribute of the received dictionary to make a determination regarding whether the attribute is a direct identifier (act 712). For example, if the attribute is a primary key, then server 104 may determine the attribute to be a direct identifier. Further, if a name or a description of the attribute includes information indicating that the attribute can be used to re-identify an individual, then the attribute may be determined to be a direct identifier. For example, attributes for a name of an individual, a social security number, a customer number, a patient ID number, an email address, and a phone number may be determined to be direct identifiers. The attribute may then be stored in the data dictionary of server 104 (act 714). In this way, when examining other attributes of other received data dictionaries, an attribute of another received data dictionary may be compared to the newly stored attribute in the data dictionary of server 104 to determine whether the attributes match. Thus, server 104 may learn new attributes as they are encountered. Acts 710, 716 and 718 may again be performed or the process may be completed.

Figure 8:
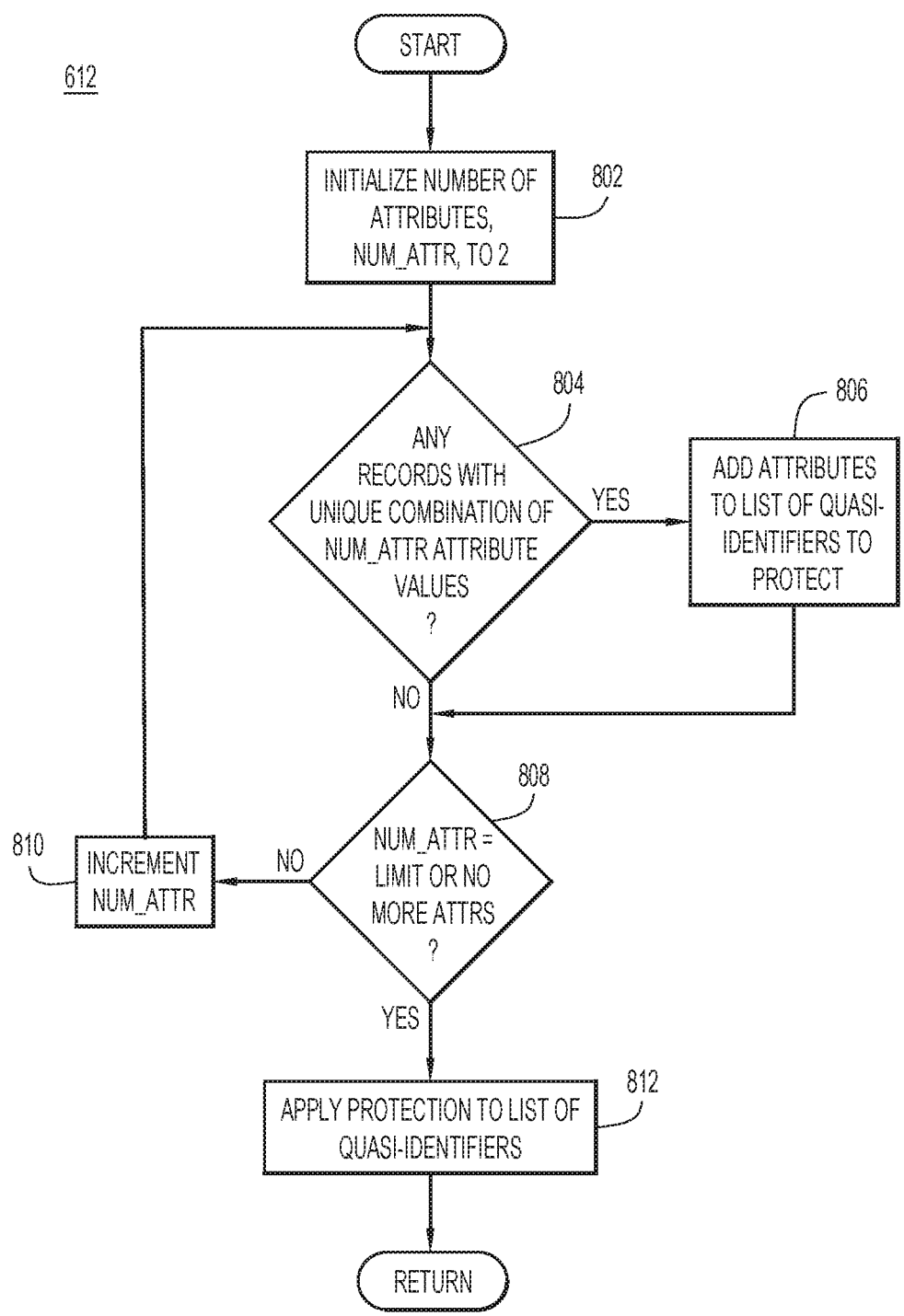
FIG. 8 is a flowchart of an example process for discovering and protecting quasi-identifiers in a dataset according to embodiments of the invention.

FIG. 8 is a flowchart of an example process for server 104 to discover quasi-identifiers (indirect identifiers) in the de-identified dataset D'. Only those attributes that have not already been determined to be direct identifiers, sensitive attributes, and part of indirect identifiers are considered in the example process. The process may begin by initializing an attribute counter, NUM_ATTR, to two (act 802). Next, records of the received dataset may be searched to determine whether any unique combination of NUM_ATTR attribute values exists (act 804). If one or more unique combinations of NUM_ATTR attribute values are found, then the corresponding group of attributes for the one or more unique combination of NUM_ATTR attribute values may be added to a list of quasi-identifiers, and the respective one or more unique combination of NUM_ATTR values may be marked for protection (act 806).

If, during act 804, no records were found in the dataset having a unique combination of NUM_ATTR values, or after performing act 806, a value of NUM_ATTR is checked to determine if it is equal to an upper limit, which may be called a power of adversary, or whether there are no additional attributes to examine, (act 808). The power of adversary is a highest number of attribute values that are examined when searching for a unique combination of attribute values, which may correspond to a maximum reasonable background knowledge that an adversary may have in order to perform a successful re-identification attack to the dataset. If NUM_ATTR is determined to not be equal to the upper limit and there are additional attributes to examine, then NUM_ATTR may be incremented by one (act 810) and acts 804-808 may again be performed.

If, during act 808, NUM_ATTR is determined to be equal to the upper limit or there are no additional attributes to examine, then protection is applied such that privacy protection requirements for quasi-identifiers are met and any sensitive attributes, as defined by protection requirements, are protected (act 812). Thus, for example, if the limit is four attributes, then if the privacy protection requirements require all combinations of four or fewer attribute values for each record to be non-unique in the dataset, then one or more attribute values of one or more records may be generalized or suppressed, such that no combination of four or fewer attribute values for any record is unique. The process may then be completed.

Although, a value of four for the upper limit was used in the above example, in other embodiments, the limit may be set to a value other than four. Usually, the power of adversary is no larger than five attributes. Although, the power of adversary is often three of four attributes.

Figure 9:
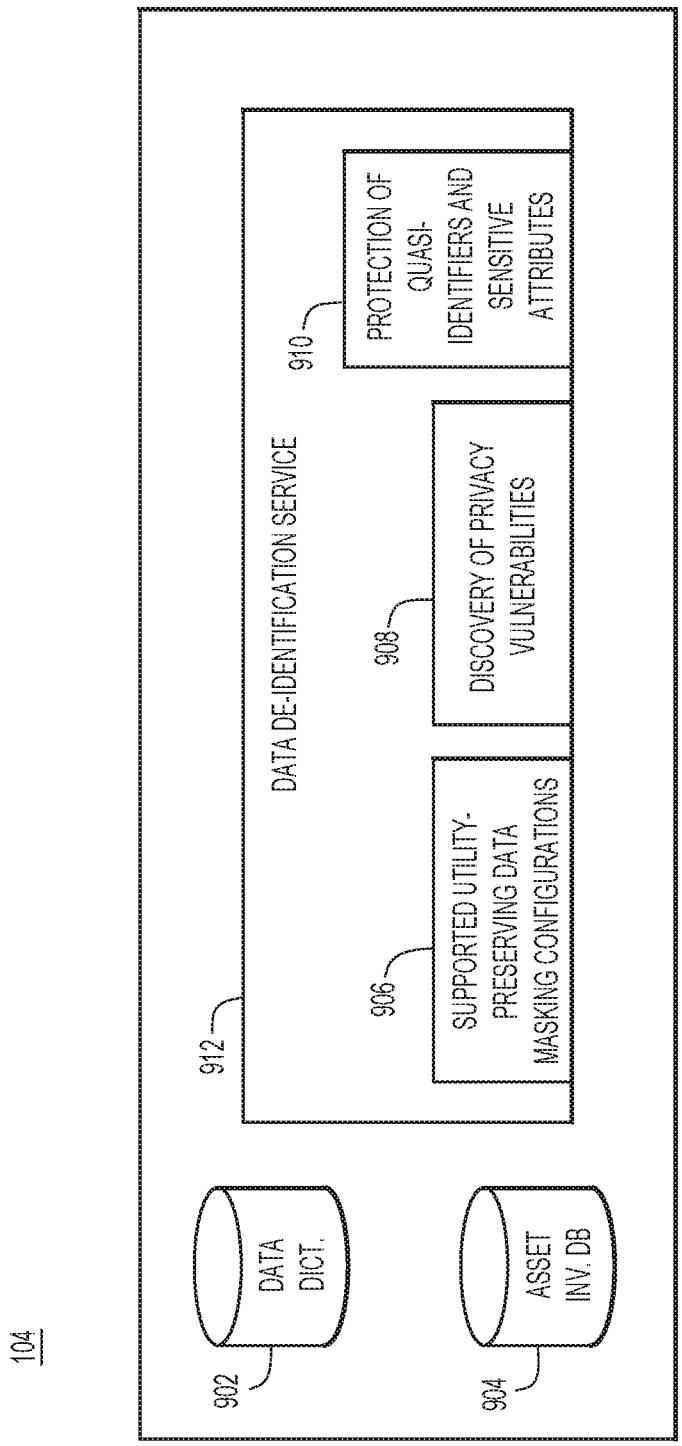
FIG. 9 is a functional block diagram of a server in a cloud computing environment according to embodiments of the invention.

FIG. 9 illustrates a high-level view of server 104 in a cloud processing platform. The server 104 may have access to a data dictionary 902 and an asset inventory database 904. A data de-identification service 912 may execute on server 104. Data de-identification service 912 may include supported utility-preserving data masking configurations 906, discovery of privacy vulnerabilities 908 and protection of quasi-identifiers and sensitive attributes 910.

Supported utility-preserving data masking configurations 406 may include information regarding supported data de-identification (data masking and data pseudonymization) techniques and their configuration options. Discovery of privacy vulnerabilities may include methods for discovering unique combinations of attribute values in records of a dataset (discovery of quasi-identifiers) as well as discovery of sensitive attributes. Protection of quasi-identifiers 910 may include data generalization and suppression techniques for protection of indirect identifiers and sensitive attributes, such that privacy requirements for a dataset may be met.

It will be appreciated that the embodiments described above and illustrated in the drawings represent only a few of the many ways of implementing various embodiments for coordinated de-identification of a dataset.

The environment of the present invention embodiments may include any number of computer or other processing systems and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various computing systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to server and/or client systems. The database systems and/or storage structures may be remote from or local to a computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method of de-identifying a dataset comprising:
receiving information from a client device at a network device, wherein the information includes a list of at least one group of techniques supported by the client device and selected from groups consisting of a group of data masking techniques and a group of data pseudonymization techniques, configuration options associated with the at least one group of techniques supported by the client device, and a first data dictionary of a dataset to be de-identified, the first data dictionary including attribute names, attribute types and associated metadata including attribute descriptions of attributes of the dataset;
mapping at the network device attributes of the first data dictionary to attributes of a second data dictionary included in the network device by matching attributes of the first data dictionary with attributes of the second data dictionary based on corresponding attribute names and attribute descriptions, the second data dictionary being different from the first data dictionary and including attribute names, attribute types and associated metadata including attribute descriptions of attributes that appear in each ingested data source, the second data dictionary further including a characterization of all direct identifiers from the each ingested data source leading to recognition of direct identifiers of the dataset;
determining at the network device first techniques and associated configuration options mutually supported by the client device and the network device based on the at least one group of techniques, wherein the determined first techniques are compatible with de-identification techniques of the network device and selected from a group of data masking techniques and data pseudonymization techniques;
sending the determined first techniques to the client device;
receiving at the network device the dataset from the client device, wherein the dataset is produced at the client device by applying one or more of the determined first techniques and the associated configuration options to corresponding attributes; and
applying a de-identification technique to the dataset at the network device to produce a resulting set of de-identified data, wherein the de-identification technique is compatible with the applied one or more first techniques and the associated configuration options to de-identify the dataset.

2. The method of claim 1, wherein the network device resides within a cloud computing environment.

3. The method of claim 1, wherein the attributes of the first data dictionary include one or more direct identifiers.

4. The method of claim 3, wherein the applying the de-identification technique further comprises:
identifying one or more sets of quasi-identifiers within the dataset; and
applying the de-identification technique to the identified one or more sets of quasi-identifiers to produce the resulting set of de-identified data.

5. The method of claim 4, wherein the identifying the one or more sets of quasi-identifiers comprises:
analyzing values of attributes of each record to find unique combinations of the values; and
identifying attributes of the unique combinations of the values as the one or more sets of quasi-identifiers.

6. The method of claim 1, further comprising:
applying further protection to the resulting set of de-identified data at the network device to improve a privacy level by extending the one or more first techniques applied at the client device using compatible techniques supported at the network device;
identifying at least one sensitive attribute within the dataset; and
applying the de-identification technique to the at least one identified sensitive attribute to produce the resulting set of de-identified data.

* * * * *